(12) United States Patent
Spector

(10) Patent No.: US 11,961,063 B1
(45) Date of Patent: Apr. 16, 2024

(54) SYSTEMS AND METHODS FOR ENHANCED PAYMENT CODES

(71) Applicant: JPMorgan Chase Bank, N.A., New York, NY (US)

(72) Inventor: Howard Spector, Woolwich, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 717 days.

(21) Appl. No.: 15/158,720

(22) Filed: May 19, 2016

(51) Int. Cl.
  *G06Q 20/32* (2012.01)
  *G06K 19/06* (2006.01)
  *G06Q 20/20* (2012.01)
  *G06Q 30/0207* (2023.01)

(52) U.S. Cl.
  CPC ... *G06Q 20/3274* (2013.01); *G06K 19/06037* (2013.01); *G06Q 20/204* (2013.01); *G06Q 20/325* (2013.01); *G06Q 30/0222* (2013.01)

(58) Field of Classification Search
  None
  See application file for complete search history.

(56) References Cited

U.S. PATENT DOCUMENTS

| | | | | |
|---|---|---|---|---|
| 2008/0172340 A1* | 7/2008 | Karlsson | ............... | G06Q 20/401 705/75 |
| 2010/0082485 A1* | 4/2010 | Lin | .................. | G06Q 20/40 235/383 |
| 2014/0180850 A1* | 6/2014 | Ackley | ............... | G06Q 20/3274 705/16 |
| 2014/0337138 A1* | 11/2014 | Chitalia | ........... | G06K 19/06028 705/16 |
| 2015/0019432 A1* | 1/2015 | Burns | ................ | G06Q 20/3276 705/44 |

* cited by examiner

*Primary Examiner* — David P Sharvin
(74) *Attorney, Agent, or Firm* — GREENBERG TRAURIG LLP

(57) ABSTRACT

Systems and methods for enhanced payment codes are disclosed. According to one embodiment, a method for presenting a machine-readable code to a transaction terminal may include (1) a computer payment application executed by a computer processor of a mobile electronic device displaying an image of a first payment device on a display; (2) the computer payment application receiving a signal from a sensor in the mobile electronic device indicating that the display is being presented to a transaction terminal; (3) the computer application requesting a machine readable code from a provider of machine-readable codes for the first payment device; (4) the computer application receiving the machine readable code for the first payment device; and (5) the computer application displaying the machine readable code on the display.

18 Claims, 4 Drawing Sheets

SYSTEMS AND METHODS FOR ENHANCED PAYMENT CODES

BACKGROUND OF THE INVENTION

1. Field of the Invention

The present invention generally relates to payment processing, and, more specifically, to systems and methods for enhanced payment codes.

2. Description of the Related Art

Machine readable codes, such as QR codes, may be used to communicate payment information to point-of-sale ("POS") terminals. The generation of the machine readable codes may require time-consuming, and bandwidth-consuming, network traffic.

SUMMARY OF THE INVENTION

Systems and methods for enhanced payment codes are disclosed. According to one embodiment, a method for presenting a machine-readable code to a transaction terminal may include (1) a computer payment application executed by a computer processor of a mobile electronic device displaying an image of a first payment device on a display; (2) the computer payment application receiving a signal from a sensor in the mobile electronic device indicating that the display is being presented to a transaction terminal; (3) the computer application requesting a machine readable code from a provider of machine-readable codes for the first payment device; (4) the computer application receiving the machine readable code for the first payment device; and (5) the computer application displaying the machine readable code on the display.

In one embodiment, the sensor may be a gyroscope, an accelerometer, a camera, etc.

In one embodiment, the method may further include the computer payment application displaying an image of a second payment device on the display before displaying the image of the first payment device on the display; and the computer payment application receiving a command to display the first payment device on the display.

Methods of validating an authenticity of a machine-readable code are disclosed. In one embodiment, a method may include (1) a code receiving entity computer processor receiving, from a code providing entity, a shared secret; (2) the code receiving entity receiving, from a mobile electronic device, a machine-readable code, the machine-readable code comprising a check value generated by the code providing entity based on the shared secret and a parameter, the parameter included in the machine-readable code; (3) the code receiving entity computer processor reading the check value and the parameter from the machine-readable code; (4) the code receiving entity computer processor generating a counter check value based on the shared secret and the one parameter; (5) the code receiving entity computer processor determining that the machine-readable code is authentic based on the check value matching the counter check value.

In one embodiment, the method may further include the code receiving entity computer processor receiving a plurality of shared secrets from the code providing entity, each shared secret associated with a secret identifier; the code receiving entity computer processor reading a secret identifier from the machine-readable code; and the code receiving entity computer processor selecting the shared secret associated with the extracted secret identifier. The selected shared secret may be used to generate the counter check value.

In one embodiment, the parameter may be a globally unique identifier, a session identifier, and/or a time stamp.

In one embodiment, the code receiving entity may be a merchant, and the code providing entity may be a financial institution.

In one embodiment, the code receiving entity may determine that the machine-readable code is authentic independently of the code providing entity.

Methods for conducting a transaction with a multi-format machine readable code are disclosed. In one embodiment, a method may include (1) a code receiving entity comprising a computer processor receiving, from a mobile device, a machine-readable code, the machine readable code comprising first payment data in a first format that is associated with a first payment network, and second payment data in a second format that is associated with a second payment network; (2) the code receiving entity computer processor that is unable to read the first data in the first format reading the second data from the machine-readable code; and (3) the code receiving entity computer processor conducting a transaction with the second data over the second payment network.

In one embodiment, the code receiving entity may not be licensed to read the first format.

In one embodiment, the second network may be associated with a code providing entity.

According to another embodiment, a method for conducting a transaction with a multi-format machine readable code may include (1) a code receiving entity comprising a computer processor receiving, from a mobile device, a machine-readable code, the machine readable code comprising first data in a first format that is associated with a first payment network, and second data in a second format that is associated with a second payment network; (2) the code receiving entity computer processor reading, from the machine-readable code, the first data in the first format and the second data in the second format; (3) the code receiving entity computer processor selecting one of the first payment network and the second payment network to conduct the transaction; and (4) the code receiving entity computer processor conducting the transaction over the selected payment network.

In one embodiment, the selection of one of the first payment network and the second payment network may be based on a benefit to the code receiving entity. The benefit to the code receiving entity may include a reduced acquisition fee, a reduced network fee, a reduced charge back fee, and/or a monetary incentive.

In one embodiment, the second payment network may be associated with a code providing entity.

In one embodiment, the selection of one of the first payment network and the second payment network may be based on a benefit to a customer that is conducting the transaction. The benefit to the customer may include a discount on the transaction, a reward, and/or a value-added payment feature.

In one embodiment, the first payment network or the second payment network may be a traditional payment network, a proprietary payment network, or a non-traditional third party payment network.

In one embodiment, a machine-readable code may be augmented to support both an industry standard dataset and a dataset specific to a particular issuer, financial institution, consortium, etc. These two datasets may coexist and be forward and backward compatible with the industry standard.

In another embodiment, the authenticity of the machine-readable code may be validated using a secure algorithm that may be self-contained so that the reader verify the authenticity of the code without being connected to the creator of the code.

In still another embodiment, because displaying a machine-readable code is costly in terms of time and system processing, the code may not be requested until the mobile electronic device senses that the customer is getting ready to pay. This may be determined, for example, by the movement of the device away from the customer to face a point of sale terminal. Gyroscopes, cameras, and other devices, both internal and external to the mobile electronic device, may be used to sense this movement.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-4.

Embodiments disclosed herein facilitate the use of payment codes, such as QR codes. For example, customers using a payment application, such an electronic wallet, may browse images the payment cards in the wallet. As each payment card is displayed, a machine-readable code (e.g., a QR code, a bar code, etc.) for the payment card is typically generated by the back-end and communicated to the mobile device. The generation of the code, however, consumes back-end resources and network communication. It also may increase back-end counters.

Thus, according to one embodiment, the payment code is not generated until the customer has either selected the payment card, or when the mobile device senses that it physically in position to display the payment code for presentation. For example, onboard sensors (e.g., gyroscopes, accelerometers, GPS sensors, RF sensors, IR sensors, cameras, etc.) may determine when the mobile device is positioned in front of a device that can read the payment code. As it is moved into position, or once it is in position, the payment code may be requested by the wallet or payment application, and the issuer may transmit the payment code to the wallet or payment application for display.

In another embodiment, multi-format machine-readable codes are disclosed. For example, payment network providers may require merchants to agree to certain terms and conditions in order to be able to read information required to use that provider's payment network. If the merchant does not agree, the merchant cannot process payments using that payment network.

According to one embodiment, a payment code may include payment network provider information for multiple payment network providers. When a point of sale device reads the payment code, if the merchant has not agreed to a first payment network provider's terms and conditions, it may not be able to read the first payment network provider's code information and/or use the first payment network provider's payment network. Instead, the merchant may be able to read the second payment network provider's information, and may conduct the transaction using the second payment network provider's payment network.

In one embodiment, if the merchant can read both the first and second payment network provider's information, the merchant back-end and/or the payment application may determine the payment network that is most beneficial to the merchant or the customer. In another embodiment, the customer may be presented with an option of the payment network to use. In still another embodiment, the payment application, the merchant, and/or the issuer may negotiate for the payment network to be used.

The disclosures of U.S. patent application Ser. Nos. 15/069,418; 15/069,458; 15/088,437 are hereby incorporated, by reference, in their entireties.

Figure 1:
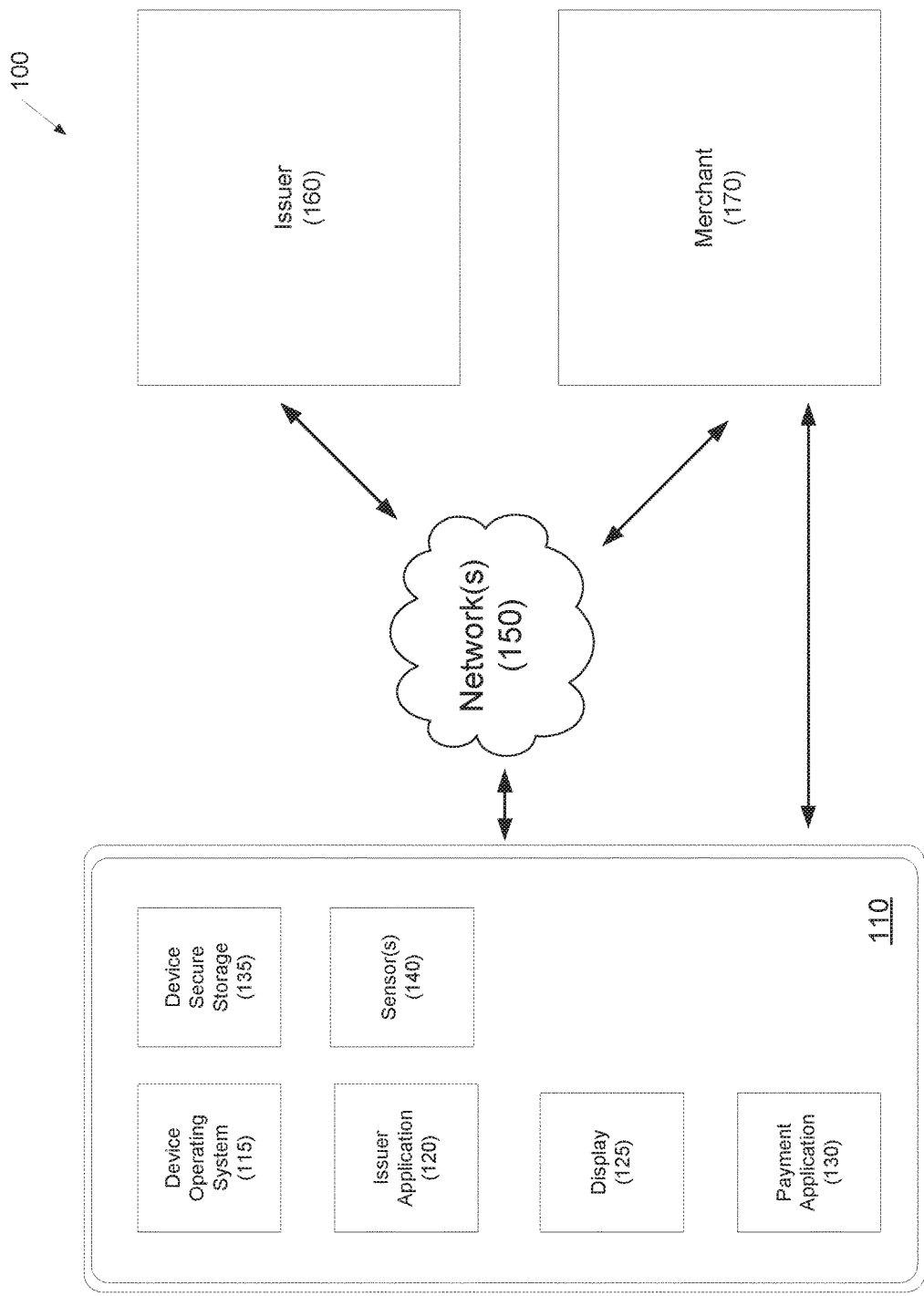
FIG. 1 depicts a system for enhanced payment codes according to one embodiment.

Referring to FIG. 1, a system for enhanced payment codes is disclosed according to one embodiment. System 100 may include mobile electronic device 110, issuer 160, and merchant 170. Any of mobile electronic device 110, issuer 160, and merchant may communicate by one or more network(s) 150.

In one embodiment, mobile electronic device 110 may be any suitable electronic device, including smartphones, tablet computers, notebook computers, internet appliances, electronic payment devices, Internet of Things devices, etc. In one embodiment, mobile electronic device 110 may include a computer processor and may also include operating system 115, application 120, display 125, payment application 130, secure storage 130, and at least one sensor 140. In one embodiment, sensor 140 may include one or more of a gyroscope, an accelerometer, a GPS sensor, a RF sensor, an IR sensor, etc.

Network 150 may include any suitable communication networks, payment networks, combinations thereof, etc. In one embodiment, additional networks (not shown) that may provide direct communication between any of mobile electronic device 110, issuer 160, and merchant 170 may be provided as is necessary and/or desired.

Figure 2:
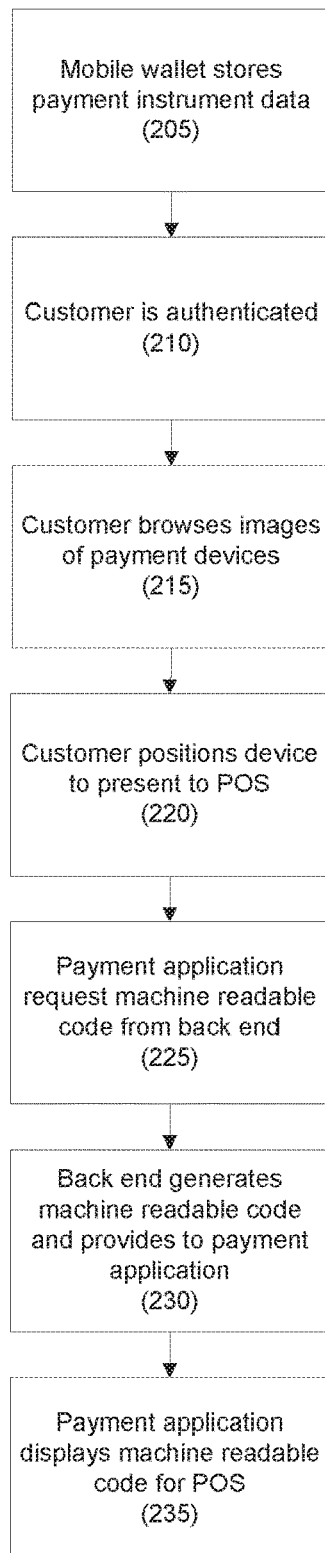
FIG. 2 depicts a method for displaying payment codes according to one embodiment.

Referring to FIG. 2, a method for displaying payment codes is disclosed according to one embodiment. In step 205, a mobile payment application (e.g., a mobile wallet) may store data for at least one payment instrument. In one embodiment, the mobile application may store an account number, an image of a payment instrument (e.g., an image of a credit card), a token, etc.

In another embodiment, the mobile payment application may store the data in the cloud.

In step 210, the customer may be authenticated to use the mobile payment application. In one embodiment, the customer may be authenticated by entering a userid and passcode; the user may also provide biometric information (e.g., a fingerprint, etc.). Any suitable way of authenticating the user may be used as necessary and/or desired.

In step 215, a customer may browse the images of the payment devices that are available on the mobile electronic device. In one embodiment, the customer may do this by swiping his or her finger against the display of the mobile electronic device.

In step 220, when the customer is ready to present the payment device to a point of sale terminal, the customer may position the mobile electronic device so that the display may be "read" by a scanner, camera, etc. at the point of sale terminal. In one embodiment, the customer may rotate the mobile electronic device from the orientation at which the customer was browsing the payment devices.

In one embodiment, one or more sensor (e.g., a gyroscope, an accelerometer, a GPS sensor, a RF sensor, an IR sensor, a camera, etc.) within the mobile electronic device may detect the positioning of the mobile electronic device. For example, a gyroscope and/or accelerometer may detect the movement to an orientation likely to be used to present a code to the point of sale device. As another example, a camera on the mobile electronic device may capture an image of the point of sale device's scanner or camera. In still another embodiment, a RF sensor may detect RF energy from the point of sale terminal. Any suitable method of sensing that the mobile electronic device is being positioned to present a code to the point of sale device may be used as is necessary and/or desired.

In step 225, the payment application may then request a machine readable code (e.g., a QR code) from an issuer of the payment device, from off-device storage (e.g., the cloud), etc. In one embodiment, the machine-readable code is not generated until the payment application senses that the mobile electronic device is being positioned for the point of sale terminal.

Any other suitable machine-readable codes may be used as necessary and/or desired.

In step 230, the back-end, cloud storage, etc. may provide the machine-readable code to the payment application. In one embodiment, the back-end may generate a specific machine-readable code for the mobile electronic device.

In step 235, the payment application may change the display from the image of the payment device to the received machine-readable code for the point of sale terminal to receive. The code may remain displayed for a certain amount of time, until the payment application receives feedback that the code was received by the point of sale device, until the mobile electronic device's orientation changes to indicate that it is not being presented to a point of sale device, until the customer "swipes" or otherwise chooses to display something else, etc. For example, in one embodiment, once the point of sale device receives the code, it may confirm receipt of the code to the mobile application.

Figure 3:
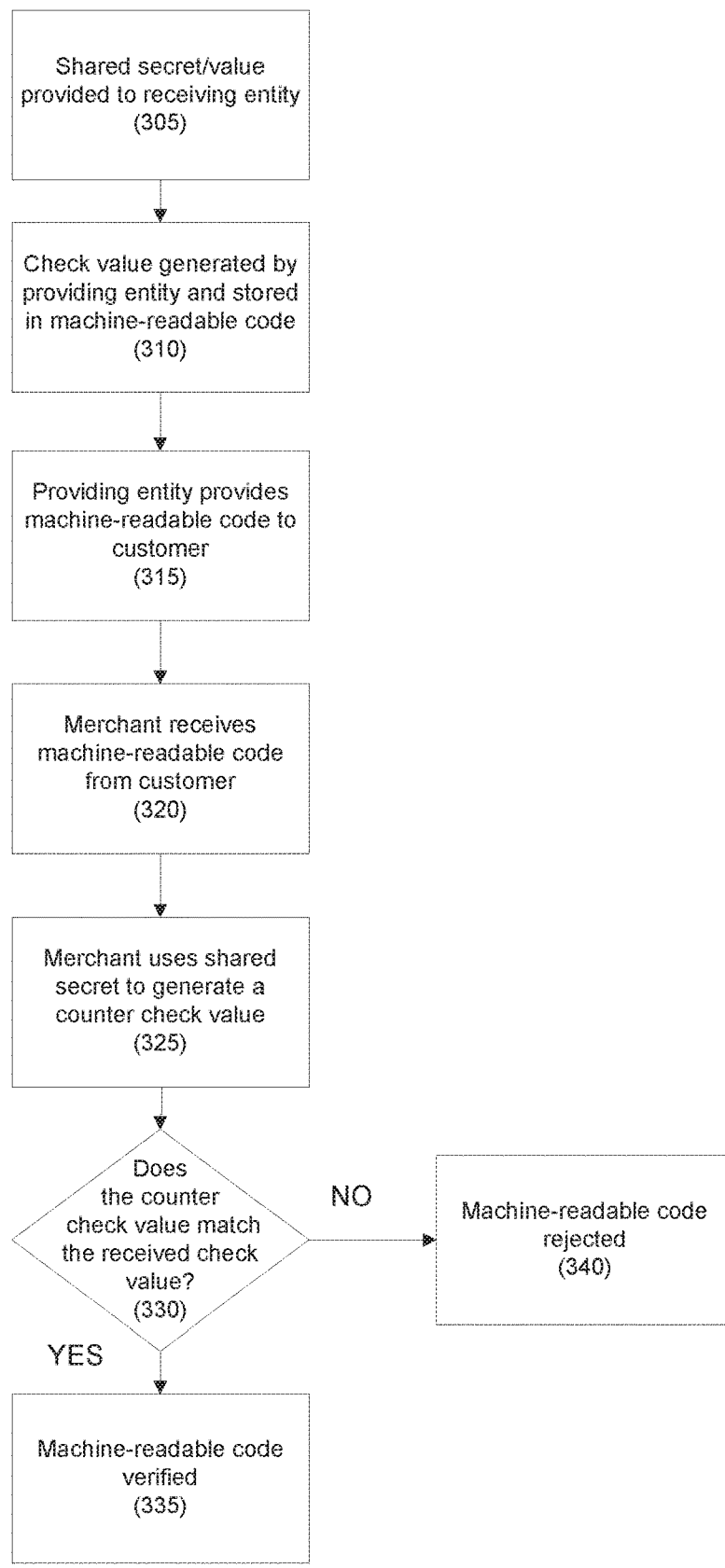
FIG. 3 depicts a method for payment code validation according to one embodiment.

Referring to FIG. 3, a method for verifying the authenticity of machine-readable codes is disclosed according to one embodiment. For example, in step 305, a provider of a machine readable code (e.g., an issuer of financial instruments, a token vault, etc.) may provide a one or more shared secrets/values with, for example, an entity that will receive the machine-readable code (e.g., a merchant). In one embodiment, each shared secret/value may be associated with an identifier, such as a version identifier.

The shared secret/value may be any suitable value. Examples of this may include a name (e.g. "Eddie") or a short sentence (e.g., "the quick brown fox"), and this data may be used as a salt into the generation of the CRC value. In one embodiment, the system may support multiple secret values with allowing for versioning or sharing different values with different partners.

In step 310, the provider may generate a check value (e.g., a cyclic redundancy check ("CRC") value) and may include that check value in a machine-readable code. In one embodiment, the check value may be generated based on any suitable parameters, including, for example, a session identifier, a globally unique identifier ("GUID"), a time stamp, and the shared secret/value. Some or all of these values, as well as other values, may be included in the generation of the check value.

In one embodiment, the check value may be generated by any suitable operation or combination of operations, including additions, subtractions, hashes, etc. Any other suitable operation may be performed as is necessary and/or desired.

In one embodiment, the providing entity may include a version identifier in the machine-readable code so that multiple versions of the shared secret/value may be used. In one embodiment, the version identifier may one bit, and may be a 1 or a 0. The version identifier may include additional bits as necessary and/or desired, depending on the number of desired versions.

In one embodiment, the machine-readable code may be a QR code. Other codes may be used as necessary and/or desired.

In step 315, the provider may provide the machine-readable code to an entity that is conducting a transaction with the receiving entity, such as a customer.

In step 320, the receiving entity may receive the machine-readable code from the customer. In one embodiment, the machine-readable code may be received by being "scanned" or otherwise imaged.

When the machine-readable code is read, the receiving entity may extract the values that are used to generate the check value. For example, if the check value is generated based on the session identifier, the GUID, and the time stamp, those values may be extracted from the machine readable code.

In step 325, the receiving entity may generate a counter check value based on the parameters and operation(s) that the providing entity used to calculate the check value that was included in the machine-readable code (e.g., shared secret, timestamp, GUID, etc.). In one embodiment, if a version identifier is used, the receiving entity may then retrieve the shared secret/value associated with that version and use that shared secret/value to calculate the counter check value.

In step 330, the receiving entity may compare the counter check value to the check value in the machine-readable code. If, in step 335, the counter check value matches the received check value, the machine-readable code is considered authentic. If, in step 340, the counter check value does not match the received check value, the machine-readable code may be rejected as not authentic.

Figure 4:
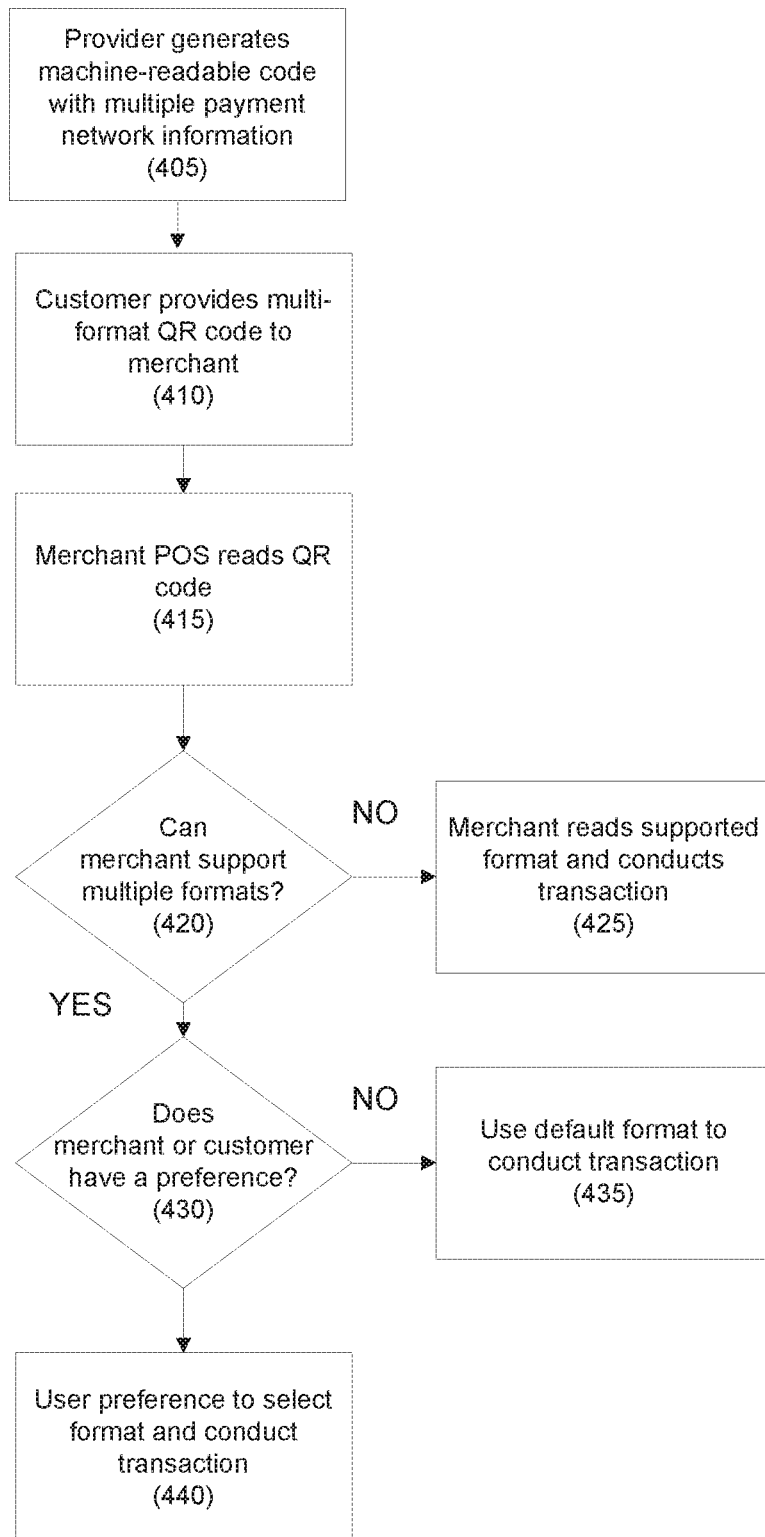
FIG. 4 depicts a method for conducting a transaction using a multiple-format machine-readable code according to another embodiment.

Referring to FIG. 4, a method of conducing a transaction using a dual-format machine readable code is provided.

In step 405, a provider of a machine-readable code may generate a machine-readable code that includes payment network information for multiple payment networks to, for example, a customer conducting a transaction with e merchant.

In step 410, the customer may provide the multi-format machine-readable code to the merchant. In one embodiment, the machine readable code may be provided optically (e.g., by the merchant point of sale device scanning or imaging the machine-readable code).

In step 415, the merchant may attempt to read the multi-format machine-readable code.

In step 420, if the merchant cannot support multiple code formats, in step 425, the transaction may conducted using the format that the merchant does support.

For example, the merchant may not have agreed with the first payment network provider to accept the first payment network; accordingly, the merchant does not have access to the specification needed to interpret the code for the first payment network.

If the merchant can support multiple formats, in step 430, it is determined if there are customer and/or merchant preference regarding the format to use. If there is not, in step 435, the transaction may be conducted using a default format.

If there is a customer and/or merchant preference, in step 440, the transaction may be conducted according to the customer and/or merchant preference. Merchant benefits include, for example, reduced acquisition fees, reduced network fees, reduced charge back fees, and/or monetary incentives. Customer benefits include, for example, transaction discounts, rewards, and/or value-added payment features.

Examples of such are disclosed in U.S. Patent Application Ser. No. 15/069,458, the disclosure of which is hereby incorporated by reference in its entirety.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for presenting a machine-readable code to a transaction terminal, comprising:

displaying, by a computer payment application executed by a computer processor of a mobile electronic device, one of a plurality payment device images stored in an electronic wallet on the mobile electronic device on a display of the mobile electronic device;

receiving, by the computer payment application, a first signal from one or more sensors on the mobile electronic device indicating that the mobile electronic device is within a certain proximity of a transaction terminal;

receiving, by the computer payment application, a second signal from the one or more sensors on the mobile electronic device indicating that the display is oriented such that it is in a position relative to an image capture device for the transaction terminal to be read by the image capture device for the transaction terminal;

generating, by the computer payment application and in response to the first signal and the second signal, a request for a machine-readable code for a payment device associated with the payment device image currently displayed on the display;

communicating, by the computer payment application and over a computer communication network, the request to a backend for an issuer of the payment device;

generating, by the backend, the machine-readable code for the payment device, wherein the machine-readable code is generated in response to the request being received;

receiving, by the computer payment application, the machine-readable code from the backend; and displaying, by the computer payment application, the machine-readable code on the display of the mobile electronic device, wherein the display of the machine-readable code replaces the display of the payment device image.

2. The method of claim 1, wherein the one or more sensors comprises a gyroscope.

3. The method of claim 1, wherein the one or more sensors comprises an accelerometer.

4. The method of claim 1, wherein the one or more sensors comprises a camera.

5. The method of claim 1, wherein the payment device comprises a credit card.

6. The method of claim 1, wherein the machine-readable code comprises a Quick Response (QR) code.

7. The method of claim 1, where the first signal is based on the one or more sensors detecting radio frequency (RF) energy from the transaction terminal.

8. The method of claim 1, where the first signal is based on the one or more sensors detecting a global positing system location of the mobile electronic device.

9. The method of claim 1, where the first signal is based on the one or more sensors detecting the transaction terminal in an image captured by a camera in the mobile electronic device.

10. A system, comprising:
a mobile electronic device comprising:
  a computer processor;
  a display;
  one or more sensors that sense a location, position and orientation of the display of the mobile electronic device; and
  a memory storing a computer payment application and an electronic wallet, wherein the electronic wallet stores a plurality of payment device images; and
a backend for a payment device issuer in communication with the mobile electronic device using a computer communication network;
wherein:

the computer payment application displays on the display one of the plurality payment device images stored in the electronic wallet;

the computer payment application receives a first signal from one or more sensors on the mobile electronic device indicating that the mobile electronic device is within a certain proximity of a transaction terminal;

the computer payment application receives a second signal from the one or more sensors indicating that the display is oriented such that it is in a position relative to an image capture device for the transaction terminal to be read by the image capture device for the transaction terminal;

the computer payment application generates, in response to the first signal and the second signal, a request for a machine-readable code for a payment device associated with the payment device image currently displayed on the display;

the computer payment application communicates the request to the backend for the payment device issuer over the computer communication network;

the backend generates the machine-readable code for the payment device, wherein the machine-readable code is generated in response to the request being received the backend communicates the machine-readable code to the computer payment application over the computer communication network; and the computer payment application displays on the display the machine-readable code, wherein the display of the machine-readable code replaces the display of the payment device image.

11. The system of claim 10, wherein the one or more sensors comprises a gyroscope.

12. The system of claim 10, wherein the one or more sensors comprises an accelerometer.

13. The system of claim 10, wherein the one or more sensors comprises a camera.

14. The system of claim 10, wherein the payment device comprises a credit card.

15. The system of claim 10, wherein the machine-readable code comprises a Quick Response (QR) code.

16. The system of claim 10, where the first signal is based on the one or more sensors detecting radio frequency (RF) energy from the transaction terminal.

17. The system of claim 10, where the first signal is based on the one or more sensors detecting a global positing system location of the mobile electronic device.

18. The system of claim 10, where the first signal is based on the one or more sensors detecting the transaction terminal in an image captured by a camera in the mobile electronic device.

* * * * *